(12) United States Patent
Vitomir

(10) Patent No.: US 9,416,058 B2
(45) Date of Patent: Aug. 16, 2016

(54) DUAL GUARD SEALER

(71) Applicant: Protocol Environmental Solutions Inc., Coquitlam (CA)

(72) Inventor: Sergio Vitomir, British Columbia (CA)

(73) Assignee: PROTOCOL ENVIRONMENTAL SOLUTIONS, INC. (CA)

( * ) Notice: Subject to any disclaimer, the term of this patent is extended or adjusted under 35 U.S.C. 154(b) by 346 days.

(21) Appl. No.: 14/012,888

(22) Filed: Aug. 28, 2013

(65) Prior Publication Data

US 2014/0065310 A1 Mar. 6, 2014

Related U.S. Application Data

(60) Provisional application No. 61/694,604, filed on Aug. 29, 2012.

(51) Int. Cl.
| | |
|---|---|
| *C04B 41/52* | (2006.01) |
| *C04B 41/00* | (2006.01) |
| *C04B 41/50* | (2006.01) |
| *C04B 41/65* | (2006.01) |
| *C04B 111/27* | (2006.01) |

(52) U.S. Cl.
CPC ............... *C04B 41/52* (2013.01); *C04B 41/009* (2013.01); *C04B 41/5089* (2013.01); *C04B 41/65* (2013.01); *C04B 2111/27* (2013.01)

(58) Field of Classification Search
CPC ...... C04B 41/5089; C04B 41/52; C04B 41/65
USPC ......................................... 524/265, 442, 556
See application file for complete search history.

(56) References Cited

U.S. PATENT DOCUMENTS

| 7,705,072 B2 | 4/2010 | Carcelli et al. |
| 2013/0245172 A1 * | 9/2013 | Buttner .................. C08L 83/04 524/243 |

FOREIGN PATENT DOCUMENTS

EP 2436735 * 4/2012

* cited by examiner

*Primary Examiner* — Edward Cain
(74) *Attorney, Agent, or Firm* — Fish & Tsang, LLP

(57) ABSTRACT

Contemplated compositions and methods for sealing cementitious material includes the step of contacting a portion of the cementitious material with a concrete sealing composition, wherein the composition comprises swellable polymers that can form a moisture adaptive barrier in the material, a silicate component that can react with free lime in the material to form CSH in the presence of a catalyst, and a water miscible silane that can react with silica in the material to form polysiloxanes.

20 Claims, No Drawings

DUAL GUARD SEALER

This application claims priority to our U.S. Provisional Application having Ser. No. 61/694,604, filed on Aug. 29, 2012.

FIELD OF THE INVENTION

The field of the invention is water based compositions and methods of sealing cementitious material against moisture by surface application of or by incorporating the sealer into the mortar.

BACKGROUND

In many parts of the world concrete is exposed to water penetration from natural or other sources. The problems associated with the excessive presence of water in concrete are well known and include degradation of the concrete due to freeze-thaw cycles, efflorescence, delamination and cracking. To avoid or reduce problems associated with the presence of water, sealers can be applied to the concrete. All or almost all of the commercially available sealers are film forming and based on one or more polymers in water or other solvents, or are non-film forming and are based on silanes or silicates.

While film forming sealers are generally easy to apply and have a chemistry that is compatible with concrete, film forming sealers often present the disadvantages of not allowing concrete to breathe, and of trapping the moisture that can be transferred from the soil. On the other hand, non-film forming silane based sealers allow for at least some breathability of the concrete, but mostly produce a surface that is water repellant but not water proof.

Among known previous efforts directed to concrete coatings is the composition described in U.S. Pat. No. 7,705,072 to Carcelli. Unfortunately, Carcelli's sealer is drawn to mechanical properties of the sealer, and especially to a flexibility of the sealer that is greater than that of the concrete, and fails to contemplate or provide compositions having various other desirable properties and functionalities.

The '072 patent and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Therefore, even though some methods and compositions are known that help to protect concrete, all or almost all of them suffer from one or more disadvantageous. Thus, there is a need for an effective concrete sealer that provides both, concrete breathability and a good moisture barrier.

SUMMARY OF THE INVENTION

The present inventive subject matter is drawn to compositions and methods of concrete sealing in which the sealer provides an adaptive barrier and densifies the concrete. In especially preferred aspects, the adaptive barrier is formed from a polymer or polymer mixture that swells in the presence of excess water to so form a barrier to water penetration, while densification is achieved by reaction of silicates with free lime in concrete to form CSH (i.e., calcium silicate hydrate), which is then further reacted with a silane component to form densified concrete.

Where desirable or needed, especially for in-service concrete, the material can be pre-treated with a gypsum remover or other composition that will destabilize previously formed calcium sulfate and other calcium salts to allow removal of these compounds prior to applying a concrete sealing composition of the inventive subject matter. Especially contemplated gypsum remover compositions include those described in applicant's co-pending Gypsum Remover application having Ser. No. 61/694,604, filed on Aug. 29, 2012, and corresponding PCT application with the title "Gypsum Remover", filed on or about Aug. 28, 2013. Such pre-treatment can provide a surface that is preferably free of any material that could block penetration of the concrete sealing composition into the concrete.

In one aspect of the inventive subject matter, the inventor contemplates a concrete sealing composition comprising a swellable polymer, and a densifier. The composition can advantageously include a reactive water miscible silane that can act as a densifier and react with silica in cementitious material to generate polysiloxanes. The swellable polymer will preferably be present in an amount effective to form a moisture adaptive barrier that swells in the presence of moisture that exceeds approximately 90% humidity, and shrinks when the humidity drops below approximately 90%. In another aspect of the inventive subject matter, the densifier will preferably comprise a silicate component, a catalyst and a water miscible silane that can increase hydrophobicity of the material, and be present in an amount effective to densify concrete and to increase hydrophobicity.

In some preferred aspects, the moisture adaptive barrier can form a semi-continuous layer between aggregate (i.e., granular) and paste in the concrete or other cementitious material, and comprises one or more of crosslinked acrylic emulsion copolymers, crosslinked polyacrylate, and polyvinyl alcohol. The moisture adaptive barrier is formed from swellable polymers present in the concrete sealing composition in an amount between 10 to 40 wt %, and more preferably between 10 to 25 wt %.

The densifier in contemplated compositions will preferably include a silicate component that is at least one of a sodium silicate, a potassium silicate and a lithium silicate, and present in the composition in an amount of between 3 to 15 wt %. In especially preferred compositions, the silicate component comprises a lithium silicate and is present in an amount between 5 to 10 wt % of the composition. Furthermore, in other preferred aspects, the densifier will further include a catalyst that is an organic acid or salt of an organic acid, and present in the composition in an amount of between 0.5 to 5 wt %. The water miscible silane that can be used to increase density and hydrophobicity of cementitious material could comprise an alkoxysilane, and present in an amount of between 3 to 40 wt %.

Compositions of the inventive subject matter can advantageously be used to seal cementitious material to protect the material from one or more of, among other things, water penetration, cracking, efflorescence, chemical attack, rebar corrosion, stains, oil, discoloration, abrasion, erosion, odor, mold and mildew. Especially contemplated compositions will also advantageously provide breathability to the material when not exposed to high humidity (e.g., less than 95% humidity, less than 90% humidity, or less than 85% humidity).

Thus, and viewed from another perspective, the inventor contemplates a method of sealing cementitious material, and especially concrete, that includes a step of forming in a subsurface volume of the material a moisture adaptive barrier from a swellable polymer. It is contemplated that this step can be achieved by applying a concrete sealing composition including the swellable polymer, and a high level of moisture will automatically cause the swellable polymer to swell to an extent to creating the moisture adaptive barrier in the material. Contemplated methods can also include a step of densifying and increasing hydrophobicity in the subsurface volume of the concrete using a silicate component, a catalyst, and a reactive water miscible silane. Similarly to the step of forming a moisture adaptive barrier, it is contemplated that the step of densifying and increasing hydrophobicity can be achieved by applying a concrete sealing composition comprising each of the silicate component, the catalyst and the reactive water miscible silane. It should especially be noted that each of the aforementioned steps could be performed using the same concrete sealing composition, although the forming of the barrier, densifying of the concrete, and reacting of the reactive water miscible silane can occur at different times or under different conditions.

In yet another aspect of the inventive subject matter, the moisture adaptive barrier could be a semi-continuous layer in the concrete between the paste and aggregate in the concrete, which can be formed from a swellable polymer or mixture of polymers. In further aspects, the step of densifying can comprise using the silicate component and the catalyst to form calcium silicate hydrate in the concrete. In yet further aspects, the step of increasing hydrophobicity comprises forming a polysiloxane in the concrete from the reactive water miscible silane.

Various objects, features, aspects and advantages of the present invention will become more apparent from the following detailed description of preferred embodiments of the invention.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present invention provides for compositions and methods of concrete sealing where the sealer is composed of distinct components to provide at least two distinct functionalities. Therefore, in one especially preferred aspect of the inventive subject matter, a concrete sealer comprises a mixture of swellable polymers, one or more silicate components, a catalyst, one or more reactive water miscible silanes, and a pH control agent as needed. The swellable polymers in the composition can form a moisture adaptive barrier that comprises a semi-continuous layer in the concrete between the paste and aggregate in the concrete, while the silanes and silicates could be used to provide for densification and additional hydrophobicity within the concrete.

As used herein, a "moisture adaptive barrier" is a semi-continuous layer that is only interrupted by paste and aggregate in the concrete, and formed from swellable polymers that readily penetrate the concrete, and will swell and shrink depending on a moisture level. For example, a moisture adaptive barrier can be formulated such that molecules therein swell sufficiently to form a barrier to water penetration in the concrete where humidity exceeds 70%, 80%, or most preferably 90%. When humidity drops below 70%, 80%, or most preferably 90%, the polymers begin to shrink, thereby allowing breathability of the concrete structure. Viewed from another perspective, it is contemplated that the polymers will preferably swell sufficiently to form the barrier when the water content in the void spaces of the concrete is at least 50%, more preferably at least 60%, even more preferably at least 70%, and most preferably at least 80%. Viewed from yet another perspective, preferred swelling polymers could provide both protection and breathability.

Particularly preferred moisture adaptive barriers are formed from swellable polymers, which can swell and shrink under varying conditions (e.g., change in humidity or temperature). Among other suitable polymers, compositions of the inventive subject matter will preferably include one or more of a cross linked acrylic and cross linked polyacrylate. For example, some preferred compositions can include at least one of a cross linked acrylic emulsion copolymer, a cross linked polyacrylate (e.g., sodium polyacrylate), and a polyvinyl alcohol (PVA). It should be appreciated that such components relatively easily penetrate the concrete structure and create a semi-continuous layer that is only interrupted by the paste and aggregate in concrete. Notably, in the presence of moisture exceeding approximately 90% humidity (e.g., between 85 to 95% humidity), these polymers will swell to the extent of creating a barrier inside the concrete that does not allow water propagation up to 100 psi or 10 U.S. perms. Once the humidity drops below approximately 90%, the swelling polymers begin to shrink and thus allows for breathability of the concrete structure.

Consequently, all water dispersible polymers and mixtures are contemplated that (a) have a structure/molecular weight suitable for penetration into a concrete structure, and (b) exhibit swelling in the presence of relatively high quantities of water (e.g., at least 50%, at least 60%, at least 70%, at least 80%, at least 90% depending on the polymers). For example, suitable polymers will swell at least 5 vol %, more typically at least 10 vol %, even more typically at least 25 vol %, and most typically at least 50 vol % in water. Thus, and viewed from another perspective, suitable swelling polymers can include, among other things, acrylate polymers and copolymers such as polymethyl methacrylate, polyacrylate emulsion, and polyacrylamide.

Especially preferred compositions will not only comprise swellable polymers to form a moisture adaptive barrier, but will additionally comprise a densifier comprising at least one of a silicate component, a catalyst, a siliconate, and a water based silane. Thus, compositions of the inventive subject matter could provide concrete breathability, increased hydrophobicity and densification. With respect to the silicate component, it should be appreciated that all known silicate components are suitable so long as such components are capable of reacting with free lime in the concrete in the presence of a catalyst. Therefore, suitable silicates include, among other silicates, sodium silicate, lithium silicate, potassium silicate, magnesium silicates, and all reasonable mixtures or blends thereof. These silicates can chemically react with excess lime in the concrete (e.g., calcium hydroxide, a byproduct of cement hydration) and produce calcium silicate hydrate (CSH), which is known to densify concrete. The sodium, lithium, potassium or magnesium portion of the silicates can stabilize and solubilize the silicate until it penetrates the concrete to react with the free lime. In further aspects of the inventive subject matter, it is contemplated that the silicate component could comprise colloidal silicates (typically 7-20 nm in size), which can penetrate even more deeply into the concrete due to their small size.

It should be noted that the presence of a catalyst could help cause or increase the rate of reaction between the aforementioned suitable silicates and free lime (typically calcium hydroxide, calcium oxide, calcium carbonate) in the concrete. Thus, and viewed from another perspective, while a catalyst is sometimes described herein as a "densifier" of contemplated compositions, it should be appreciated that the catalyst does not in and of itself undergo a chemical reaction that densifies the concrete. Instead, the catalyst(s) could cause or accelerate the reaction between free lime and the silicate components, which can lead to densification of the cementitious material. Contemplated catalysts can include organic and inorganic acids, including for example, hydrochloric acid, sulfuric acid, nitric acid, phosphoric acid, boric acid, hydrofluoric acid, hydrobronic acid, and perchloric acid. However, it should especially be noted that organic carboxylic acids and carboxylates are most preferred as inorganic acids can significantly damage the concrete.

Therefore, it should be appreciated that especially suitable catalysts include, among other things, monocarboxylic acids (e.g., formic acid, acetic acid, gluconic acid), dicarboxylic acids (e.g., oxalic acid, malonic acid, succinic acid, glutaric acid, adipic acid, pimelic acid), tricarboxylic acids (e.g., citric acid, isocitric acid, aconitic acid, carballylic acid, trimesic acid), and any other suitable carboxylic acids or carboxylates.

With respect to the silanes included in some compositions of the inventive subject matter, especially contemplated silanes include those that are soluble in water and that have a molecular composition suitable for reaction with silica in the concrete to thereby form polysiloxanes, which further increase the density of the concrete by filling in the porosity of the concrete. Additionally, it should be noted that the polysiloxanes also provide further water repellency and a barrier against chlorides penetration and mobility inside the concrete structure. Thus, the silicates and silanes can function as densification agents that not only strengthen concrete but also add hydrophobicity/water repellency to the concrete. Among other silanes, suitable silanes can include one or more alkoxylanes (e.g., ethoxyfunctional, methoxyfunctional), aminosilanes, vinyl silanes, epoxy silanes, methacryl silanes, alkylsilanes, phenyl silanes, methyl silanes, n-octyl silanes, propyl silanes, and chlorosilanes.

In still further contemplated aspects, it should be noted that the exact composition of the formulation may vary considerably. Therefore, in one exemplary preferred aspect of the inventive subject matter, a sealing composition could comprise silicates of at least one of sodium, potassium, and lithium and be present in the composition from 1-25, more preferably 3-15% (w/w) in the final composition. Most preferably, the sealing composition comprises lithium silicate present at 5-10% (w/w) in the final composition. A particularly preferred catalyst is a carboxylic acid or carboxylic acid salt such as citric acid, fumaric acid, tartaric acid, malic acid, glycolic acid, and their salts. The catalyst is preferably present from 0.1-10% (w/w), more preferably 0.5-5% (w/w) in the final composition. Reactive water miscible silanes are preferably present from 3-40% (w/w) by weight in the final composition, and more preferably from 3-10% (w/w) in the final composition. With respect to the swellable polymer, it is preferred that the polymer is a cross linked acrylic or cross linked polyacrylate and is present from 10-40% (w/w), and more preferably from 10-25% (w/w) active in the final composition. The sealer composition may also include polyvinyl acetate (PVA), which may be present from 0.5-5% (w/w), and most preferably from 0.5-3% (w/w) in the final composition. Where desired, the sealer will also include a pH adjusting agent, typically in an amount of between 2-5% (w/w), and more typically between 1-3% (w/w) of the composition. The balance is preferably water. Viewed from a different perspective, it is generally preferred that the pH of the final composition is basic, and in the range of between 7 to 14, more preferably between 10 to 14, and most preferably between 12 to 13, inclusive. Furthermore, the final composition to be applied to cementitious materials could comprise a clear, odorless liquid that is completely miscible in water.

In a typical example of use, the sealing composition is applied to a substrate to be protected with a sprayer, brush or roller (preferably a low pressure sprayer) to allow penetration into the substrate. Surfaces that could benefit from sealing compositions of the inventive subject matter include surfaces comprising new concrete, in service concrete or other cementitious materials, including for example, architectural surfaces, facades, entrances, pool decks, patios, stadium, arenas, stairwells, ramps, public facilities and industrial plants. Once applied, the swellable polymers, silicates, catalysts, and silanes could advantageously penetrate deeply within the substrate (e.g., at least 1 mm, at least 3 mm, at least 4 mm, at least 5 mm) to provide a water impermeable membrane along a surface and sub-surface (e.g., 1-5 mm, more preferably 2-4 mm deep) of the cementitious material. The water impermeable membrane could have multiple functionalities, including densification and increased hydrophobicity of the concrete, while still advantageously allowing the concrete to breathe.

For example, a moisture adaptive barrier could be formed in a subsurface of concrete from the swellable polymers in the sealing composition that is applied thereto. This moisture adaptive barrier is preferably a semi-continuous layer in the concrete between the paste and aggregate of the concrete. Furthermore, densifying and increasing hydrophobicity in the subsurface volume of the concrete could be achieved when the silicate component and the catalyst form calcium silicate hydrate (CSH) in the concrete in the presence of free lime. Still further densification and hydrophobicity could be achieved when the water miscible silanes react with silica in the concrete to thereby form polysiloxanes.

Thus, specific embodiments and applications of methods of concrete sealers have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The invention claimed is:

1. A concrete sealing composition comprising:
    a swellable polymer in an amount effective to form a moisture adaptive barrier in a volume of concrete; and
    a silicate component, an organic acid catalyst in an amount effective to cause or accelerate a reaction between free lime in the volume of concrete and the silicate component, and a reactive water miscible silane having a structure suitable to react with silica in the volume of concrete to thereby form a polysiloxane, all in an amount effective to densify concrete and to increase hydrophobicity.

2. The concrete sealing composition of claim 1 wherein the moisture adaptive barrier has a composition such that the barrier swells in the presence of moisture exceeding approximately 90% humidity.

3. The concrete sealing composition of claim 1 wherein the moisture adaptive barrier is formed from one or more of crosslinked acrylic emulsion copolymers, crosslinked polyacrylate, and polyvinyl alcohol.

4. The concrete sealing composition of claim 1 wherein the swellable polymer is present in an amount of between 10 to 40 wt %.

5. The concrete sealing composition of claim 1 wherein the swellable polymer is present in an amount of between 10 to 25 wt %.

6. The concrete sealing composition of claim 1 wherein the silicate component is at least one of a sodium silicate, a potassium silicate, and a lithium silicate.

7. The concrete sealing composition of claim 1 wherein the silicate component is present in an amount of between 3 to 15 wt %.

8. The concrete sealing composition of claim 1 wherein the organic acid catalyst comprises a monocarboxylic acid, a dicarboxylic acids, or a tricarboxylic acid.

9. The concrete sealing composition of claim 1 wherein the organic acid catalyst is present in an amount of between 0.5 to 5 wt %.

10. The concrete sealing composition of claim 1 wherein the reactive water miscible silane is an alkoxysilane.

11. The concrete sealing composition of claim 1 wherein the reactive water miscible silane is present in an amount of between 3 to 40 wt %.

12. A method of sealing concrete comprising:
    forming in a subsurface volume of concrete a moisture adaptive barrier from a swellable polymer; and
    catalytically reacting free lime in the subsurface volume of concrete with a silicate component and reacting a water miscible silane with silica in the volume of concrete to thereby form a polysiloxane to thereby densify and increase hydrophobicity of the subsurface volume of concrete.

13. The method of claim 12 wherein the steps of forming and catalytically reacting are performed using a single sealing composition.

14. The method of claim 12 wherein the moisture adaptive barrier forms a semi-continuous layer in the subsurface volume of the concrete between paste and aggregate.

15. The method of claim 12 wherein the moisture adaptive barrier is formed from one or more of a crosslinked acrylic emulsion copolymer, a crosslinked polyacrylate, and a polyvinyl alcohol.

16. The method of claim 12 wherein the step of catalytically reacting comprises using an organic acid catalyst to form calcium silicate hydrate in the concrete.

17. The method of claim 12 wherein the silicate component comprises at least one of a sodium silicate, a potassium silicate, and a lithium silicate.

18. The method of claim 12 wherein the moisture adaptive barrier has a composition such that the barrier swells in the presence of moisture exceeding approximately 90% humidity.

19. The method of claim 12 wherein the water miscible silane is selected from the group consisting of an alkoxysilane, an aminosilane, a vinyl silane, an epoxy silane, a methacryl silane, an alkylsilane, a phenyl silane, a methyl silane, an n-octyl silane, a propyl silane, and a chlorosilane.

20. The method of claim 12 wherein the silicate component comprises colloidal silicates.

* * * * *